R. Phillips,
Carpenter's Gage.
N° 61,248.   Patented Jan. 15, 1867.
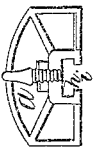
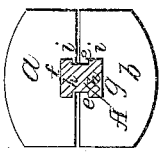
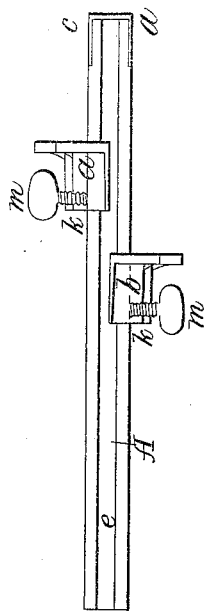
Witnesses:
William Henry Clifford
Henry C. Houston
Inventor:
Russell Phillips

United States Patent Office.

RUSSELL PHILLIPS, OF GARDINER, MAINE.

Letters Patent No. 61,248, dated January 15, 1867.

---

IMPROVEMENT IN CARPENTERS' GAUGES.

---

*The Schedule referred to in these Letters Patent and making part of the same.*

---

TO ALL WHOM IT MAY CONCERN:

Be it known that I, RUSSELL PHILLIPS, of Gardiner, in the county of Kennebec, and State of Maine, have invented a new and improved Double Rail Gauge; and I hereby declare the following to be a full, clear, and exact description thereof, which will enable others to make and use my invention, reference being had to the accompanying drawings, forming part of this specification, in which—

Figure 1 shows a side view of my improved gauge.

Figure 2, an end view of the two slides, showing the method of their connection with the stock.

Figure 3, a detached view of the end of one of the slides, showing the method of securing the same at any desired point on the stock.

Same letters indicate like parts.

My improvement consists of a gauge having two slides and two knife-brads, constructed and operating as hereinafter set forth.

$a\ b$ show the two slides; A the stock; $c\ d$ the two knife-brads. Upon opposite sides of the stock, A, are made grooves or channels, $e$, which extend to the end of the stock on one end, so as to admit of the slides being placed thereon. Each of the grooves forms two rails or tracks on each side of the stock. (See $f\ g$.) Over these rails and into the grooves the slides are fitted by means of a recess in the slides and lips or shoulders near the outer edges of the recesses. $h$ shows the recesses; $i$ the lips. Upon the back sides of the slides are made projections, in which are made the recesses, with the lips the same as on the front edge of the slides. These projections are seen at $k$. Through these projections work thumb-screws, $m$, to hold the slides at any place on the stock. The slides are on opposite sides of the stock. The grooves, $e$, are wide enough to allow the parts of the slides moving therein to pass each other without touching. By this arrangement the mechanic is enabled to mark the width and thickness of any piece of work with the same gauge, one slide being set to denote the width, the other the thickness, and then the distances scored off on the lumber with the brads. Thus the use of more than one tool of this kind is avoided where two measurements are to be made and lumber to be marked and worked upon two sides thereof. A convenient way of manufacturing is to cast the slides of metal to fit a wooden stock of a certain size.

What I claim as my invention, and desire to secure by Letters Patent, is—

The combination of the stock having the grooves and rails with the two slides on its opposite sides, the slides having the recesses, the lips, the projections, and thumb-screw, as and for the purposes herein set forth.

RUSSELL PHILLIPS.

Witnesses:
WILLIAM HENRY CLIFFORD,
HENRY C. HOUSTON.